US008369667B2

(12) United States Patent
Rose

(10) Patent No.: US 8,369,667 B2
(45) Date of Patent: Feb. 5, 2013

(54) DOWNHOLE CABLE

(75) Inventor: Lawrence Charles Rose, Huntsville, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 31 days.

(21) Appl. No.: 12/993,437

(22) PCT Filed: May 22, 2009

(86) PCT No.: PCT/US2009/045040

§ 371 (c)(1), (2), (4) Date: Nov. 18, 2010

(87) PCT Pub. No.: WO2009/143461

PCT Pub. Date: Nov. 26, 2009

(65) Prior Publication Data

US 2011/0075978 A1 Mar. 31, 2011

Related U.S. Application Data

(60) Provisional application No. 61/055,915, filed on May 23, 2008.

(51) Int. Cl.

| | |
|---|---|
| ***G02B 6/44*** | (2006.01) |
| ***H01B 7/00*** | (2006.01) |
| ***G01V 1/00*** | (2006.01) |

(52) U.S. Cl. ........ 385/102; 385/100; 385/101; 385/103; 385/104; 385/105; 385/106; 385/107; 385/108; 385/109; 385/110; 385/111; 385/112; 385/113; 385/114; 174/120 R; 174/120 SR; 367/25; 367/35; 367/64; 367/82; 367/83

(58) Field of Classification Search .......... 385/100–114; 174/120 R, 120 SR; 367/25, 35, 64, 82–83
See application file for complete search history.

(56) References Cited

U.S. PATENT DOCUMENTS

| | | | | |
|---|---|---|---|---|
| 4,156,104 | A * | 5/1979 | Mondello | 174/70 R |
| 4,547,774 | A * | 10/1985 | Gould | 340/854.7 |
| 5,495,546 | A * | 2/1996 | Bottoms et al. | 385/101 |
| 7,188,406 | B2 * | 3/2007 | Varkey et al. | 29/825 |
| 7,450,053 | B2 * | 11/2008 | Funk et al. | 342/22 |

FOREIGN PATENT DOCUMENTS

| | | |
|---|---|---|
| EP | 1065674 B1 | 11/2006 |
| WO | WO-2009143461 A2 | 11/2009 |
| WO | WO-2009143461 A3 | 11/2009 |

OTHER PUBLICATIONS

"International Application Serial No. PCT/US2007/045040, Written Opinion mailed Jul. 9, 2009".
"International Application Serial No. PCT/US2009/045040, Search Report mailed Jul. 9, 2009".

* cited by examiner

*Primary Examiner* — Brian M. Healy
*Assistant Examiner* — Guy Anderson
(74) *Attorney, Agent, or Firm* — Schwegman Lundberg & Woessner, P.A.; Brad Misley

(57) ABSTRACT

Downhole cables are described that are configured to protect internal structures that may be detrimentally impacted by exposure to the downhole environment, by protecting such structures by at least two protective layers. In some examples, the structures to be protected may be housed in a protective tube housed within the protective outer sheath. The described configuration enables the use of structures such as polymer fibers in the cables for strength and load-bearing capability by protecting the fibers, by multiple protective layers, from exposure to gases or fluids within a wellbore.

21 Claims, 3 Drawing Sheets

DOWNHOLE CABLE

RELATED APPLICATIONS

This patent application is a nationalization under 35 U.S.C. 371 of PCT/US2009/045040, filed May 22, 2009 and published as WO 2009/143461 A2 on Nov. 26, 2009, which claims priority benefit under 35 U.S.C. 119(e) of U.S. Provisional Patent Application Ser. No. 61/055,915 filed May 23, 2008, which applications and publication are incorporated herein by reference in their entirety.

BACKGROUND OF THE INVENTION

The present invention relates generally to cables for use in a downhole environment, such as may be used in oil or gas wells for conveying well logging tools and other types of equipment within wellbores, and as may be otherwise be used for communication with devices located in downhole environments.

Many types of cables have been used over the years for communication with logging tools and other equipment located in a downhole environment. The most common of these cables are typically referred to as "wireline," by virtue of their inclusion of one or multiple layers of wire armor which also serve as the load bearing members of the cable. While wireline cables are typically durable, at least in many environments, they are heavy and not always well-suited for certain applications.

For example, in many high-pressure environments obtaining adequate pressure sealing around a wireline cable can not only be difficult, but can have environmental consequences. For example, one method of establishing sealing in such a high-pressure environment comprises a high-pressure pack off which injects grease under high pressure to provide the necessary sealing between various types of pack off stuffing elements and the non-uniform surface of the wireline. However, such systems create a great deal of friction that can impede movement of the cable. Additionally, the injected grease can often present an environmental hazard, such as when it is introduced to the surface environment, such as when the wireline is removed from a wellbore. Also, in some cases the weight of the wireline and the friction involved in high pressure operations presents a barrier to the depth to which the cable and attached tool strings may be deployed, particularly in high pressure environments.

Because of these difficulties with wireline, cables have been proposed to minimize the problems associated with a non-uniform external surface, and also to reduce the weight of cables. While these proposed cables are believed to achieve some advantages over wireline-type cables, they are not perfect for all applications. For example, in such proposed cables the load bearing capability is typically provided by polymer fibers, such as fibers of the polymer marketed under the trade name Zylon (believed to be a trademark of the Toyobo Corporation). Zylon is understood to be a range of thermoset polyurethane synthetic polymers, derived from electron beam cross-linked thermoplastic polyurethane. While Zylon fibers are believed to generally maintain their strength at relatively high temperatures, up to approximately 500° F., and are believed to function adequately in high humidity environments; the current expectation is that such fibers are not compatible with environments that present both high temperature and high humidity. Thus, many high temperature subsurface applications are expected to be problematic for cables utilizing Zylon fibers for the load bearing capability of the cable.

Additionally, many types of corrosive materials commonly found in downhole environments, such as $H_2S$ and $CO_2$ are believed to adversely affect Zylon's load bearing capabilities at downhole temperatures. In most conventionally proposed cables, the Zylon fibers are next to the outermost layer. Accordingly, any damage to that outermost layer will allow corrosive liquids or gases, to directly contact the Zylon fibers thereby leading to potential degrading of the fibers. Additionally, any damage in such an outermost layer would typically introduce water to the Zylon fibers, further potentially degrading the fibers. Such cables have been proposed that would include a PETP tape layer between the outer covering and the Zylon fibers; however such tape layers are not known to offer resistance to penetration by the problematic water or the corrosive gases or fluids. Accordingly, conventionally proposed synthetic fiber cables are believed to provide less than optimal capabilities for use in many types of downhole operations.

Accordingly, the present invention provides for new cable structures that are believed to overcome the deficiencies of currently known cable configurations.

BRIEF DESCRIPTION OF THE DRAWINGS

Referring now to the drawings in more detail, therein are depicted various embodiments demonstrating examples of apparatus in accordance with the present invention.

DETAILED DESCRIPTION OF PREFERRED EMBODIMENTS

Cables as described herein are configured to protect internal structures that may be detrimentally impacted by exposure to the downhole environment, by protecting such structures by at least two protective layers. In preferred embodiments, the structures to be protected will be housed in a protective tube housed within the protective outer sheath. In this circumstance, such structures as polymer fibers, including the above-referenced Zylon fibers provided in some downhole cables for strength and load-bearing capability, are protected by at least two different protective layers from exposure to gases or fluids within a wellbore. Thus, even if the outermost protective sheath becomes damaged, an additional protective layer exists between such polymer fibers and gases or fluids in the wellbore. This additional protective layer not only protects the fibers and other internal layers from the gases and other fluids, but also provides abrasion resistance in the event that the outer sheath is damaged. As described in more detail later herein, cables that may benefit from such structures may include those with only 1 or 2 data-capable structures, such as electrical conductors or optical fibers; up to those with more conductors or optical fibers, with seven conductors being a common industry norm. As described in reference to the following figures, such cables may include, as just some examples, a protective tube surrounding a polymer fiber layer, where both are concentric to a central core of the cable; or where such polymer fibers or other structures to be protected are distributed in a plurality of separate groupings, with each such grouping retained within its own protective tube.

Figure 1:
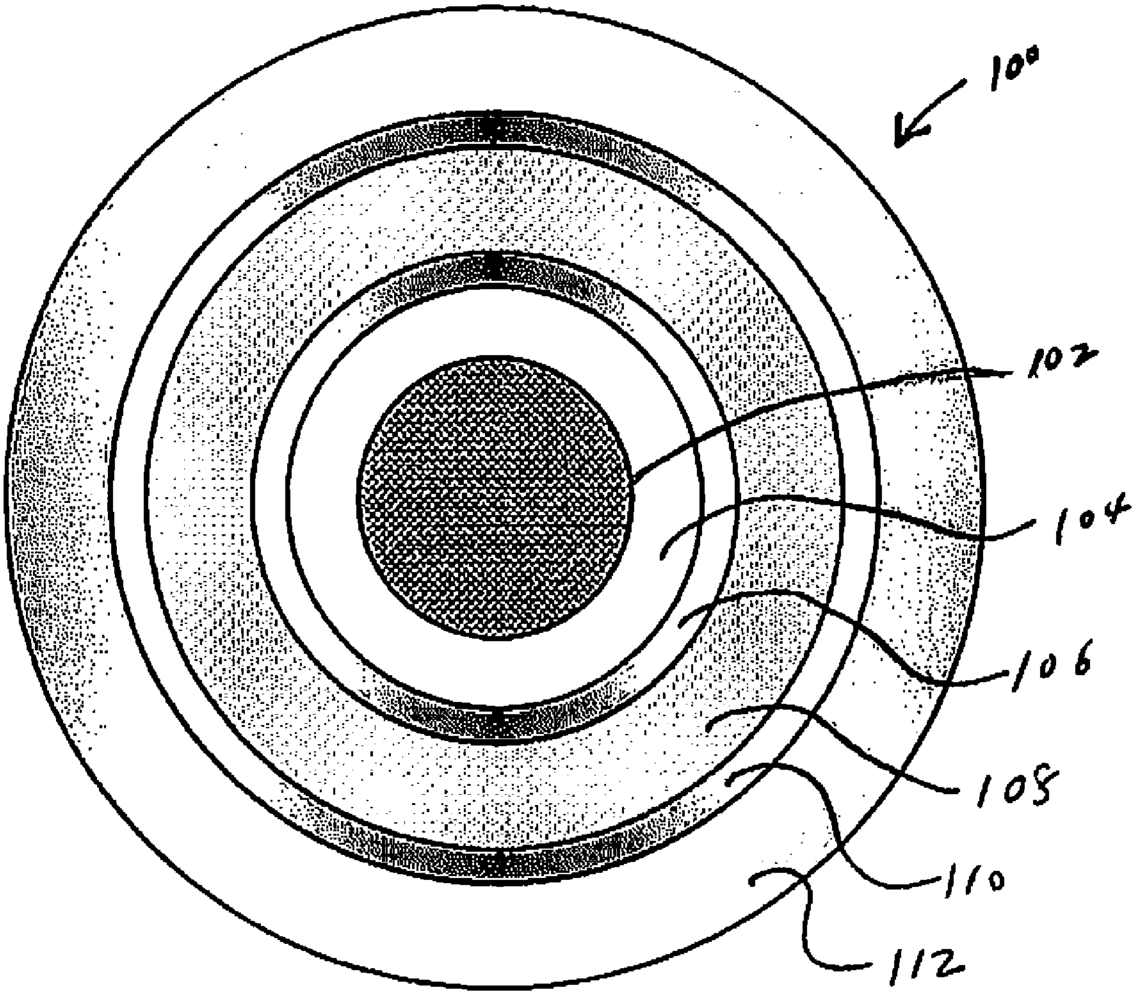
FIG. 1 depicts an example cable utilizing a uniform and symmetrical single element core structure.

Referring now to the drawings in more detail, and particularly to FIG. 1, therein is depicted an example of one configuration of cable 100 in accordance with the present invention. Cable 100 will preferably be formed to have a tensile strength of at least 4,000 psi, though greater tensile strength is always virtually always desirable. Additionally, cables with an outer diameter roughly between 0.300 inch and 0.500 inch, are currently believed to be ones that will benefit most from construction alternatives based on the examples and variations as described herein.

In the depicted embodiment of cable 100 is designed to be a uniformly cylindrical cable. Accordingly, each concentric material layer within cable 100 is intended to have a symmetrical cross-section as depicted in FIG. 1, within the realities of conventional manufacturing techniques and the effects of usage on such cables. Cable 100 includes a cylindrical central core 102 which is preferably formed of a communication element capable of carrying data signals, such as either an electrical conductor or an optical fiber. Where core 102 is an electrical conductor it will preferably be a metal conductor, and may also include a protective coating. One example of such a conductor and coating is a copper conductor coated with a nickel protective layer. Where central core 102 is an optical fiber, it may be desirable to encase the fiber in a protective tube, such as a metal tube (not illustrated).

An protective layer 104 surrounds central core 102. Protective layer 104 may be formed of any material suitable for use in downhole conditions. In applications where the central core includes an electrical conductor, protective layer will commonly also be electrically insulative. In some applications, particularly such as when central core 102 comprises one or more optical fibers, protective layer 104 may be formed of metal, and may, in some embodiments, be provided in the form of the above-mentioned metal casing around an optical fiber. Where an insulative protective layer 104 is desired, a layer formed of, or at least including, perfluoroalkoxy fluorocarbon (PFA) is currently preferred. Other materials such as Polytetrafluoroethylene (PTFE) may be used in some instances. However, in general, the higher capacitance of PTFE can be problematic to data transmission through a carrier, such as where core 102 is an electrical conductor. PFA is also generally formed to have a higher effective temperature rating, improving its desirability in downhole cables. PFA (perfluoroalkoxy fluorocarbon) also resists cracking better than PTFE.

Cable 100 then includes concentric layers intended to protect a polymer fiber layer 108, in effect, in a protective tube, formed between an inner layer 106 on the inside of polymer fiber layer 108, and an outer layer 110 surrounding polymer fiber layer 108. Inner layer 106 and outer layer 110 are selected for their ability to withstand adverse materials and conditions in a downhole environment, and for their ability to thereby protect polymer fiber layer 108 from potentially damaging materials and conditions. As discussed previously, where a polymer fiber layer 108 is formed entirely or at least in part of Zylon fibers, it is considered important that inner layer 106 and outer layer 110 be able to protect the Zylon fibers from fluids and gases in the downhole environment, even if the outer protective sheath 112 were to be damaged. The inner layer 106 may be unnecessary if the core is designed to eliminate gas, water, and corrosive migration up and down the core by adding a "water block" agent or fluid. An example of such a water block agent would be an inert material such as silicon oil, which will inhibit intrusion or migration of at least one of water, gas, or hydrocarbons within or through the cable. In general, an inert viscous material, with a viscosity suitable to generally resist migration under at least some operating conditions would be desirable. In general, a viscosity above approximately 10 Pa-s. is considered desirable, with greater viscosities considered generally a positive quality for most applications. It would also be desirable for the Zylon or other fiber to be completely soaked in a fluid block material, as discussed above, so that gas and water cannot migrate to or within the Zylon fiber layer.

Additionally, in order to provide a direct electrical circuit through cable 100 it is preferred that at least one, and possibly both, of inner layer 106 and outer layer 110 be formed of a solid electrical conductor, such as a metallic conductor, including for example, a suitable solid metal conductor. However, for many corrosive environments a solid metal conductor may be less advantageous than a metallic alloy, such as nickel-containing alloys, such as that marketed under the trade name MP35N by Carpenter Technology Corp. and Specialty Alloys of Reading, Pa., which is an alloy including major components of nickel, molybdenum and chromium. Other possible alternatives would be other metal alloys, such as examples having the above major components, such as those marketed in the U.S. by Special Metals Corporation, under the trade names Incaloy alloys 27-7 and 25-6. As yet another alternative, a solid metal or other metallic layer might be coated with a protective coating, which may be of one or more or various types. Examples of just suitable coatings include: nickel; a powder coating such as a fluoropolymer coating, such as a ethylene-ehlorotrifluoroethylene coating, such as that marketed under the trade name Halar by Solvay Solexis, headquartered in Bollate, Italy; and any other corrosion and temperature resistant coating suitable for providing the necessary protection to the conductor in the contemplated environment. If the outer protective layer 110 is metal it could be used as the final outer protective layer. Alternatively such a metal layer it could be coated and protected by a suitable downhole-compatible plastic such as PFA or PTFE.

In the event that it is desired that either of inner layer 106 and outer layer 110 not be formed of a metallic material, then that layer will preferably be formed of a plastic material such as polyether ethyl ketone (PEEK); or another material such as fluorinated ethylene propylene (FEP) or another high density polypropylene. The use of a PEEK or metal layer is expected to be useful in maintaining the uniform and cylindrical exterior of cable 100. PEEK offers the desirable advantages of being generally impregnable to water and also to both gas and liquid hydrocarbons. If another material is used, then the material will preferably be selected to be one that is relatively resistant to the migration or other penetration of the material by at least one of (and most preferably by all of), water, gas and hydrocarbons. One advantage of using nonmetallic materials in cable 100 is the reduction in weight that may be achieved. Utilizing the described Zylon polymer fiber layer 108, encased within the described non-metal protective layers is believed to be capable of yielding a cable having a weight on the order of 55-65 lbs/1000 feet, measured in air; but a density yielding a weight on the order of 27-35 lbs/1000 feet, measured in water. This may be compared, for example, to a typical weight for a single conductor wireline cable which may typically be on the order of 200 lbs/1000 feet, measured in air, with relatively little reduction in measured weight in water.

Outer protective sheath 112 will again preferably be formed of PEEK, or another plastic material having exceptional resistance to abrasion, temperature and invasive materials. A low coefficient of friction and a relatively light weight are highly desirable properties. For many applications, it is believed that a PEEK-variant, better suited to withstand temperatures up to approximately 500° F. will be preferred not only for outer sheath 112, but also for the internal layers where PEEK has been described for use. Examples of such PEEK variants include PEEK HT, from Bodecker Plastics, Inc. of Shiner, Tex. or Victrex PEEK, from Victrex plc, headquartered in Lancashire, UK.

Certain variations to the described structure for cable 100 are also envisioned. For example, both inner layer 106 and outer layer 110 of the protective tube surrounding the polymer fiber layer 108 could be formed of an insulative material, such as the previously-described PEEK or PEEK-based layer. In that circumstance an additional layer including a conductive material, such as, for example, a conductive metallic mesh might be placed either immediately outwardly of insulated layer 104, or between outer tube layer 110 and outer sheath 112.

Another variation would be to add reinforcing elements, such as, for example, glass fibers, a fibrous mesh, or other similar structures to one or more of the PEEK layers (or to other material layers), to add rigidity and body to that layer, and thereby to the cable. Such fibers or mesh reinforcing elements might be formed of other polymer materials or might include, for example, carbon fibers. In general, it is believed that either some form of mesh, or long fibers, will be preferable to support and strengthen the PEEK layer or layers, and minimize the spread of any damage that may occur. In embodiments wherein reinforcing elements in the form of glass fibers are used, it is contemplated that in most cases, the percent of glass fibers would be 20% or less of the reinforced PEEK material layer. Various processes are known to those skilled in the art for manufacturing reinforced PEEK (and other similar materials). One contemplated method for constructing the reinforced PEEK layer, would be to extrude the PEEK over fibers or a mesh already in position in the cable structure under manufacture, under conditions that facilitate the forming of a composite layer of the PEEK with the fibers or mesh. In many cable embodiments, the PEEK (or similar material layer) will have a thickness on the order of 0.10 to 0.20 inch. However, those skilled in the art will appreciate that the exact properties and dimensions of the described materials and structures will be variable depending on the intended use and the resulting design capabilities of the cable. Such material property and sizing determinations are believed to be within the ability of those skilled in the art having the benefit of the present disclosure.

Another variation on cable 100 would be to include multiple electrical conductors or optical fibers, or a combination of the two, within the region of the central core. In such cases the fibers would be encapsulated in a jacket, such as formed of PFA or polytetrafluoroethylene (PTFE) to maintain, to the maximum extent possible, a cylindrical core section. The presence of the cylindrical core, whether through a single cylindrical central conductor or optical fiber, or through a plurality of such members retained in a jacket defining a generally cylindrical structure, presents an optimally stable configuration for the core and facilitates generally cylindrical layers concentric to the core. The resulting cable structure, preferably with concentric layers that define generally cylindrical layers (layers that are as cylindrical as reasonably possible in view of the materials and structures used and reasonable manufacturing constraints), will be relatively resistant to deformation from the cylindrical shape under pressure, and thus form a cable particularly well-suited for use in high pressure environments. For example, cables in accordance with this embodiment, particularly suited for use in such high pressure applications, the maintaining of the cylindrical core will be one significant feature to ensure that the further layers surrounding that core, and particularly the outer sheath 112, will retain their generally cylindrical confirmations as much as is possible, even under extensive use and exposure to high pressures, potentially exceeding 30,000 psi.

In some cases, it may be desirable to use additional layers, such as tape layers, such as of Teflon and/or Kapton tape. In some cases such tape layers may ease construction of the cable; while in other embodiments, a Teflon tape layer (for example) may facilitate relative motion between layers, such as will facilitate repeated flexing of the cable without detrimental strain being induced within the cable.

Figure 2:
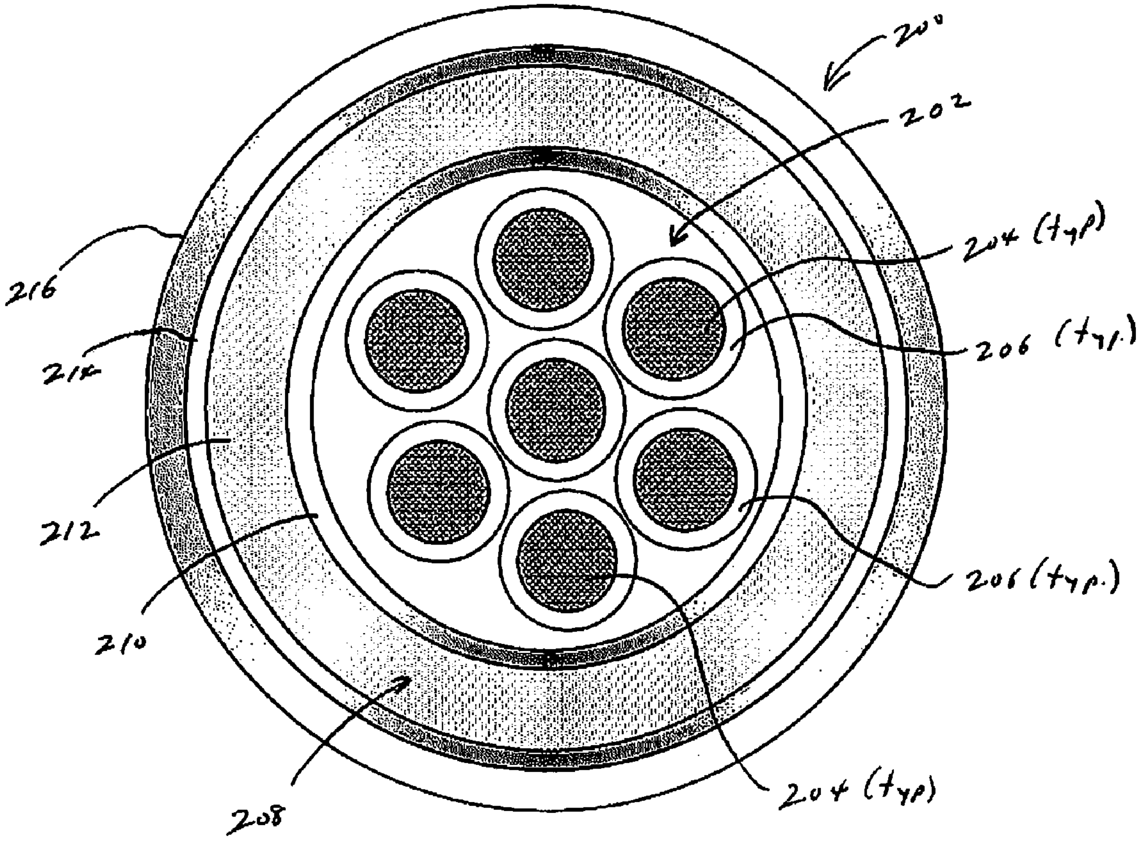
FIG. 2 depicts an alternative embodiment of a cable utilizing a multi-element core structure.

Referring now to FIG. 2, therein is depicted an alternative configuration of a cylindrical cable 200 in accordance with the present invention. Cable 200 includes a central core assembly 202 that includes a plurality of data-capable structures 204, again such as either electrical conductors or optical fibers, or a combination of the two; with each encased within a respective protective coating, such as an insulator 206. This group or bundle of encased data structures 204 (with 7 such components depicted in FIG. 2), is encased within a plastic jacket such as PFA or PTFE, to form and maintain, to the maximum extent possible, a cylindrical core. Then, external to the core, is a protective tube assembly, indicated generally at 208, having an inner layer 210, and an outer layer 214 surrounding a polymer fiber layer, such as a Zylon fiber layer, as previously described. Again, an outer sheath 216, formed as described relative to cable 100, is provided.

Figure 3:
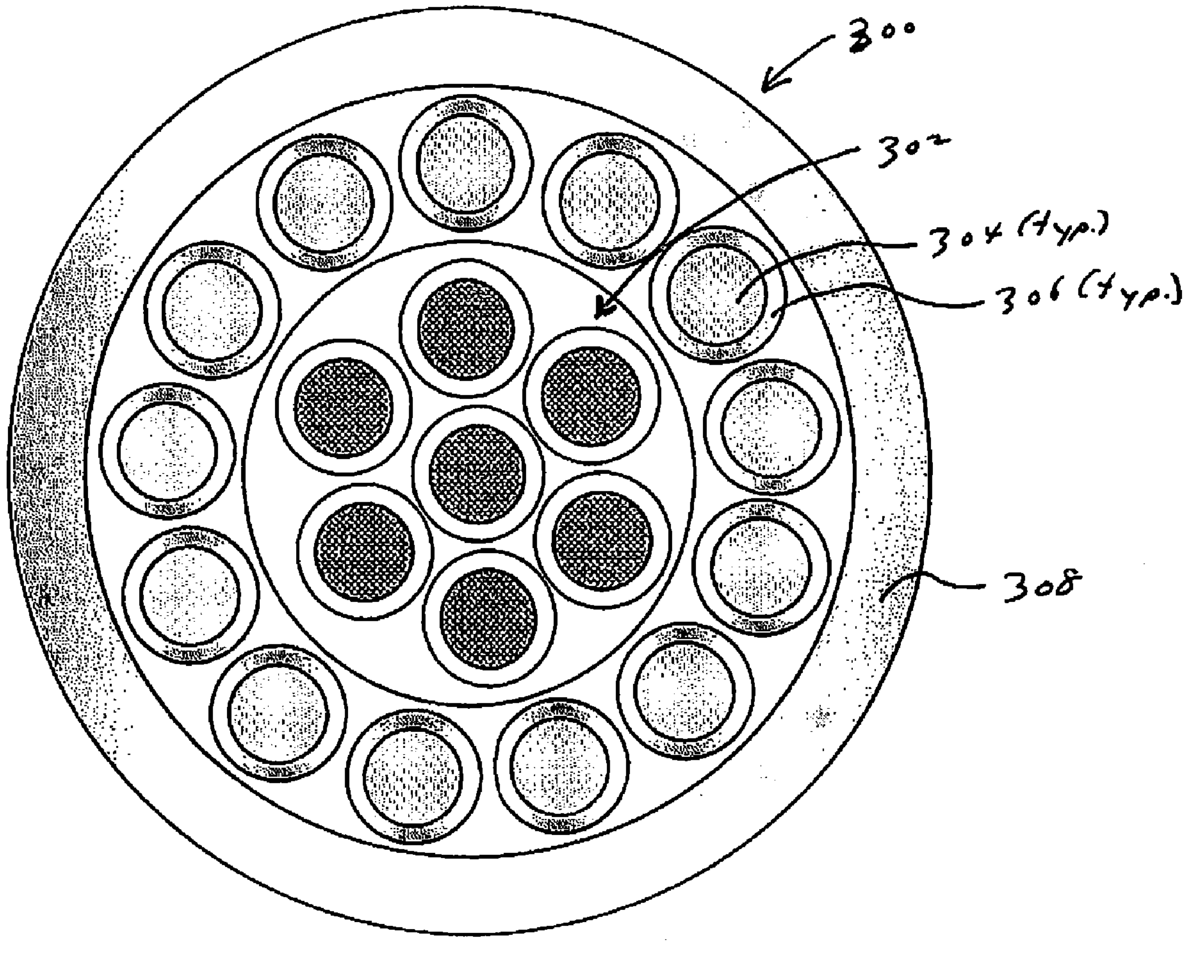
FIG. 3 depicts yet another alternative embodiment of a cable utilizing a plurality of groupings of protected structures, with each grouping retained within its own protective tube.

Referring now to FIG. 3, therein is depicted another alternative embodiment of a cylindrical cable 300, in accordance with the present invention. Cable 300 differs from cable 200 primarily in that rather than a single concentric layer of polymer fibers, such as the described Zylon fibers, cable 300 includes a number of individually formed and isolated bundles of such polymer fibers, with each bundle protected in a respective tube or sheath. Thus, even if one or more of such protective sheaths becomes damaged or otherwise impaired in some way, there are additional load bearing fibers which are separately protected, thereby minimizing the likelihood of a catastrophic failure of the load-bearing elements of cable 300.

Cable 300 again includes a core assembly 302 which may be formed identically to that described relative to core assembly 202 of cable 200, or with a single conductor core such as cable assembly 100. Surrounding core assembly 302 is a layer formed of the plurality of polymer fiber bundles 304 (13 such bundles are depicted in the illustrated example), with each such bundle retained within a protective tube 306, which again may be formed of PEEK, or of a metallic component, such as a metal or metal alloy, as described in reference to cable 100 of FIG. 1. And again, because of the desirability of maintaining, to the maximum extent possible, a cylindrical cross-section, the tubes 306 and their encased fiber bundles 304, are encased in a plastic jacket, such as a PFA or PTFE jacket to retain relative orientation of the bundles, and thus also the desired cylindrical definition to the layer. Once again, a protective sheath 308, such as may be formed of PEEK, as described earlier herein, will be provided.

Many modifications and variations may be made relative to the example cables described and depicted herein to illustrate the current invention. For example, and as described in some cases above, many variations and refinements to the example cables are contemplated. For example while suitable materials, and in many cases alternatives, have been described other materials may be used by either for the load-bearing structures; the protective tubes; the electrical conductors; and/or the outer sheath. Further, additional layers, such as additional protective layers or additional conductive structures may be provided.

I claim:

1. A downhole cable structure, comprising:

a central core structure;

a non-metallic structure configured to provide tensile strength and load bearing capacity to the cable structure;

a first protective layer encasing said non-metallic structure, said first protective layer being relatively impervious to at least one of water, gas and hydrocarbons;

a second protective layer surrounding all other components of said cable structure, the second protective layer being non-metallic, and providing an abrasion-resistant sheath of said cable structure.

2. The downhole cable structure of claim 1, wherein the non-metallic structure is formed at least in part of Zylon.

3. The downhole cable structure of claim 1, wherein the non-metallic structure is formed at least in part of a thermoset polyurethane synthetic polymer.

4. The downhole cable structure of claim 1, wherein the first protective layer is formed as a generally continuous sleeve.

5. The downhole cable structure of claim 1, wherein the first protective layer comprises perfluoroalkoxy fluorocarbon.

6. The downhole cable structure of claim 1, wherein the first protective layer is formed essentially entirely of a perfluoroalkoxy fluorocarbon material.

7. A downhole cable structure, comprising:

a central core structure comprising at least one of an electrical conductor or an optical fiber;

a non-metallic load bearing member formed concentric to the central core structure;

a first protective layer encasing said non-metallic load-bearing member, said first protective layer formed as a generally contiguous sheath, the first protective layer resisting intrusion of water and hydrocarbons;

a second protective layer surrounding the first protective layer, the second protective layer being non-metallic and providing an abrasion-resistant sheath of said cable structure.

8. The downhole cable structure of claim 7, wherein the non-metallic load-bearing member comprises a structure formed of a thermoset polyurethane synthetic polymer.

9. The downhole cable structure of claim 8, wherein the structure formed of a thermoset polyurethane synthetic polymer comprises Zylon fibers.

10. The downhole cable structure of claim 7, further comprising a fluid blocking material to inhibit migration of at least one of water, gas, or hydrocarbons within the cable structure.

11. The downhole cable structure of claim 10, wherein the fluid blocking material is located in contact with the a non-metallic load bearing member, and wherein the a non-metallic load bearing member comprises a thermoset polyurethane synthetic polymer material.

12. The downhole cable structure of claim 7, wherein at least one of the first and second protective layers comprises polyether ethyl ketone (PEEK).

13. The downhole cable structure of claim 12, wherein at least one layer comprising PEEK further comprises reinforcing elements therein.

14. The downhole cable structure of claim 13, wherein the reinforcing elements comprise at least one of reinforcing fibers and a reinforcing mesh.

15. A downhole cable, comprising:

a central core structure having a generally cylindrical cross-section, wherein said central core structure comprises at least one data capable structure selected from the group consisting essentially of an electrical conductor and an optical fiber;

an insulative layer extending concentric to the central core structure;

a layer of synthetic and non-metallic fibers extending concentric to the insulative layer, such layer of fibers forming a primary load-bearing structure within said cable;

a first barrier layer extending concentrically around said layer of fibers, the first barrier layer constructed of a material relatively resistant to penetration by water and hydrocarbons;

a protective sheath extending around said first barrier layer, the protective sheath constructed from a material providing abrasion resistance, and also resistance to penetration by at least one of water, gas and hydrocarbons.

16. The downhole cable of claim 15, wherein the central core structure comprises a plurality of data capable structures, and wherein the central core structure comprises a jacket encasing the plurality of data capable structure.

17. The downhole cable of claim 15, wherein the layer of synthetic and non-metallic fibers comprises fibers comprising a thermoset polyurethane synthetic polymer.

18. The downhole cable of claim 15, wherein the protective sheath comprises a polyether ethyl ketone material.

19. The downhole cable of claim 16, wherein the first barrier layer is formed at least in part of a material selected from the group consisting essentially of polyether ethyl ketone, fluorinated ethylene propylene, a metal, and a metallic material.

20. The downhole cable of claim 16, further comprising a fluid blocking material to inhibit migration of at least one of water, gas, or hydrocarbons within the cable structure.

21. A downhole cable structure, comprising:

a central core structure comprising at least one data capable structure selected from the group consisting essentially of an electrical conductor and an optical fiber;

a plurality of bundles of polymer fibers arranged in a concentric layer to the central core structure;

a protective sleeve around at least one bundle of the plurality of bundles of polymer fibers, the protective sleeve resistant to penetration by at least one of water, gas and hydrocarbons; and a protective sheath extending around the first barrier layer, the protective sheath comprising a material providing abrasion resistance and resistance to penetration by at least one of water and hydrocarbons.

* * * * *